(12) United States Patent
Chen

(10) Patent No.: US 12,260,497 B2
(45) Date of Patent: Mar. 25, 2025

(54) CAPACITY MANAGEMENT OF VIRTUAL SPACE IN THE METAVERSE

(71) Applicant: T-MOBILE INNOVATIONS LLC, Overland Park, KS (US)

(72) Inventor: Zhisheng Chen, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 81 days.

(21) Appl. No.: 18/074,998

(22) Filed: Dec. 5, 2022

(65) Prior Publication Data

US 2024/0185515 A1 Jun. 6, 2024

(51) Int. Cl.

| | |
|---|---|
| G06T 17/00 | (2006.01) |
| G06F 3/14 | (2006.01) |
| G06Q 50/20 | (2012.01) |
| G06T 11/60 | (2006.01) |
| G06T 13/40 | (2011.01) |
| G06T 19/00 | (2011.01) |
| G06V 40/20 | (2022.01) |

(52) U.S. Cl.
CPC .................... *G06T 17/00* (2013.01)

(58) Field of Classification Search
CPC ....... G06T 17/00; G06T 19/003; G06T 13/40; G06T 11/60; G06Q 50/20; G06V 40/20; G06F 3/1454; G06F 3/011
See application file for complete search history.

(56) References Cited

U.S. PATENT DOCUMENTS

| | | | | |
|---|---|---|---|---|
| 11,412,011 | B1 * | 8/2022 | Benjamin | ............... H04L 67/02 |
| 2014/0152698 | A1 * | 6/2014 | Kim | ..................... G06F 3/04815 |
| | | | | 345/633 |
| 2016/0234149 | A1 * | 8/2016 | Tsuda | ..................... H04L 67/306 |
| 2020/0175760 | A1 * | 6/2020 | Guo | ......................... G06F 3/011 |
| 2024/0096095 | A1 * | 3/2024 | Assam | .................. G06V 20/20 |

FOREIGN PATENT DOCUMENTS

| | | | | |
|---|---|---|---|---|
| CN | 101291416 B | * | 6/2010 | ......... H04L 65/1083 |
| KR | 102507260 B1 | * | 7/2021 | ............. G06Q 50/20 |

* cited by examiner

*Primary Examiner* — Wesner Sajous
(74) *Attorney, Agent, or Firm* — Shook, Hardy & Bacon L.L.P.

(57) ABSTRACT

According to aspects herein, methods and systems for capacity management of virtual space are provided. The method begins with estimating a capacity size need of a virtual space in a metaverse. A first quantity of avatars is monitored as avatars enter, leave, and occupy the virtual space. The first quantity of avatars in the virtual space is compared with a predetermined fill threshold. Based on the comparing, a duplicate virtual space may be created if the first quantity of avatars in the virtual space exceeds the predetermined fill threshold. A user may transmit a request to join a virtual space in a metaverse to a network. The request to join the virtual space contains at least one avatar identification and may be a request for a group to join. The user or group receives a sequential identifier of the virtual space and then joins the virtual space.

14 Claims, 4 Drawing Sheets

CAPACITY MANAGEMENT OF VIRTUAL SPACE IN THE METAVERSE

BACKGROUND

In the metaverse, people may rent or buy virtual store space, conference rooms, social environments, virtual theater, game room, parks, or similar gathering spaces. The size of the virtual rooms may be estimated based on the dimensions of objects exhibited in the space, such as goods on store shelves in a virtual store. Virtual stores may need to plan for thousands of potential customers, especially if the store is national or international in scope. Buying such large spaces incurs wasted costs unless the space is filled and these large spaces also occupy more memory and computing resources than needed when the number of customers or visitors is less than the space was designed to accommodate. Managing the virtual environment does not provide for the size of the virtual space in the metaverse and currently provide only capacity management within the virtual machine.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for capacity management of virtual space in a network are provided. The method begins with estimating a capacity size need of a virtual space in a metaverse. A first quantity of avatars is monitored as avatars enter, leave, and occupy the virtual space. The first quantity of avatars in the virtual space is compared with a predetermined fill threshold. Based on the comparing, a duplicate virtual space of the virtual space may be created if the first quantity of avatars in the virtual space exceeds the predetermined fill threshold.

The present disclosure also provides a method for capacity management of virtual space in a network. The method begins with transmitting a request to join a virtual space in a metaverse to a network. The request to join the virtual space contains at least one avatar identification. The method then continues with joining the virtual space after determining that a first quantity of avatars already in the virtual space does not exceed a predetermined maximum quantity of avatars.

In addition, the present disclosure provides a non-transitory computer storage media storing computer-usable instructions that, that when used by the processor, cause the processor to perform the following operations: estimate a capacity size need of a virtual space in a metaverse. The processors also monitor a first quantity of avatars entering, leaving, and occupying the virtual space. Next, the processors compare the first quantity of avatars in the virtual space with a predetermined fill threshold. Based on the comparison, a duplicate virtual space of the virtual space may be created if the first quantity of avatars in the virtual space exceeds the predetermined fill threshold.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
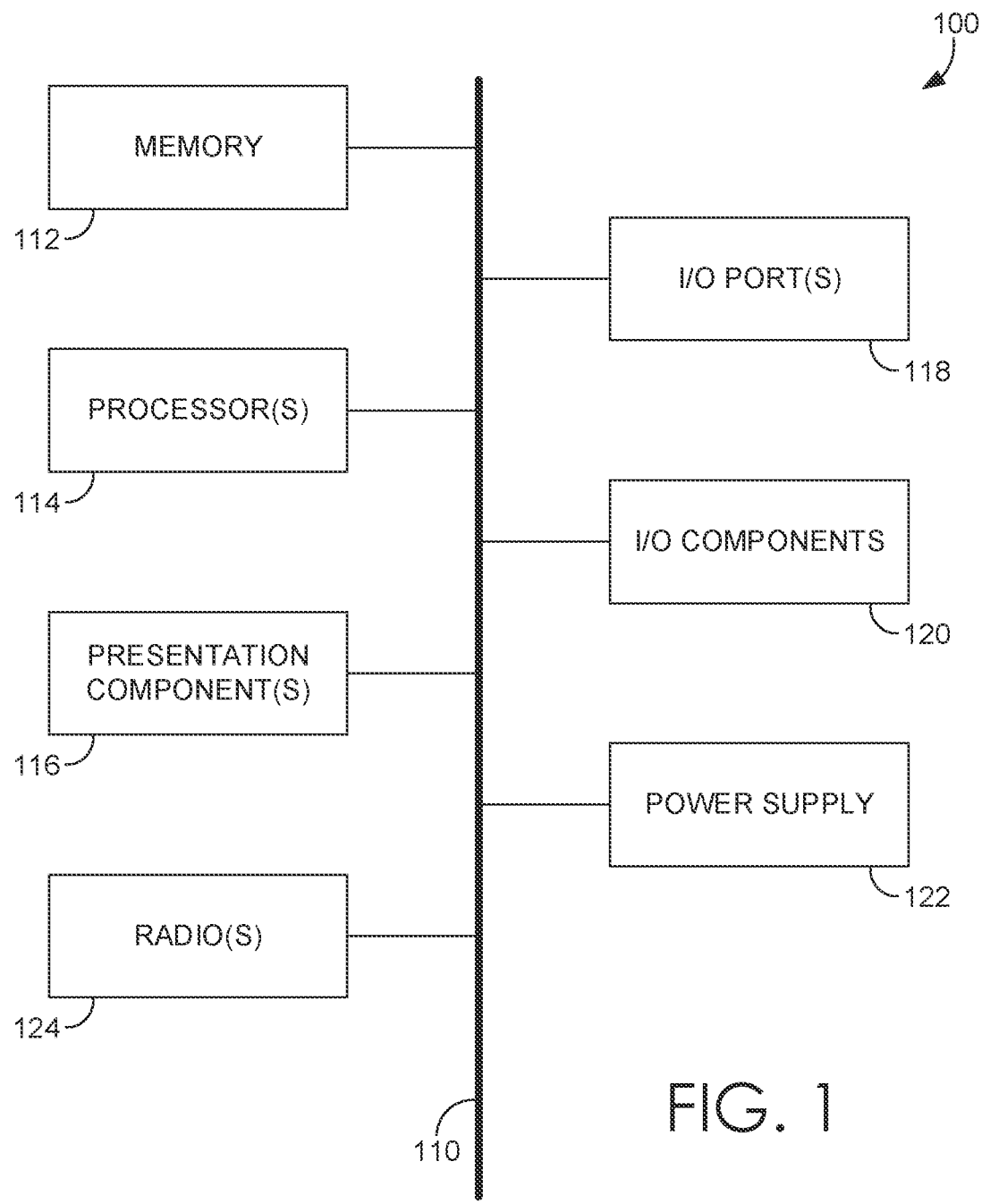
FIG. 1 depicts a computing environment suitable for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer storage media and communications media.

Computer storage media, or machine-readable media, include media implemented in any method or technology for storing information. Examples of stored information include computer-useable instructions, data structures, program modules, and other data representations. Computer storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, 6G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, pre-coding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

In a 5G network the network data analytics function (NWDAF) tracks mobility, usage, and real time dynamics of pattern recognition for the overall behavior of customers. The (NWDAF) allows mobile network operators to determine which contents may be candidates for edge computing.

In accordance with a first aspect of the present disclosure, a method for capacity management of virtual space in a network is provided. The method begins with estimating a capacity size need of a virtual space in a metaverse. A first quantity of avatars is monitored as avatars enter, leave, and occupy the virtual space. The first quantity of avatars in the virtual space is compared with a predetermined fill threshold. Based on the comparing, a duplicate virtual space of the virtual space may be created if the first quantity of avatars in the virtual space exceeds the predetermined fill threshold.

A second aspect of the present disclosure is directed to a method for capacity management of virtual space in a network. The method begins with transmitting a request to join a virtual space in a metaverse to a network. The request to join the virtual space contains at least one avatar identification. The method then continues with joining the virtual space after a determination is made that a first quantity of avatars already in the virtual space does not exceed a predetermined maximum quantity of avatars.

Another aspect of the present disclosure is directed to a non-transitory computer storage media storing computer-usable instructions that, that when used by the processor, cause the processor to perform the following operations: estimate a capacity size need of a virtual space in a metaverse. The processors also monitor a first quantity of avatars entering, leaving, and occupying the virtual space. Next, the processors compare the first quantity of avatars in the virtual space with a predetermined fill threshold. Based on the comparison, a duplicate virtual space of the virtual space may be created if the first quantity of avatars in the virtual space exceeds the predetermined fill threshold.

FIG. 1 depicts a computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, radio 116, transmitter 118, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 present data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
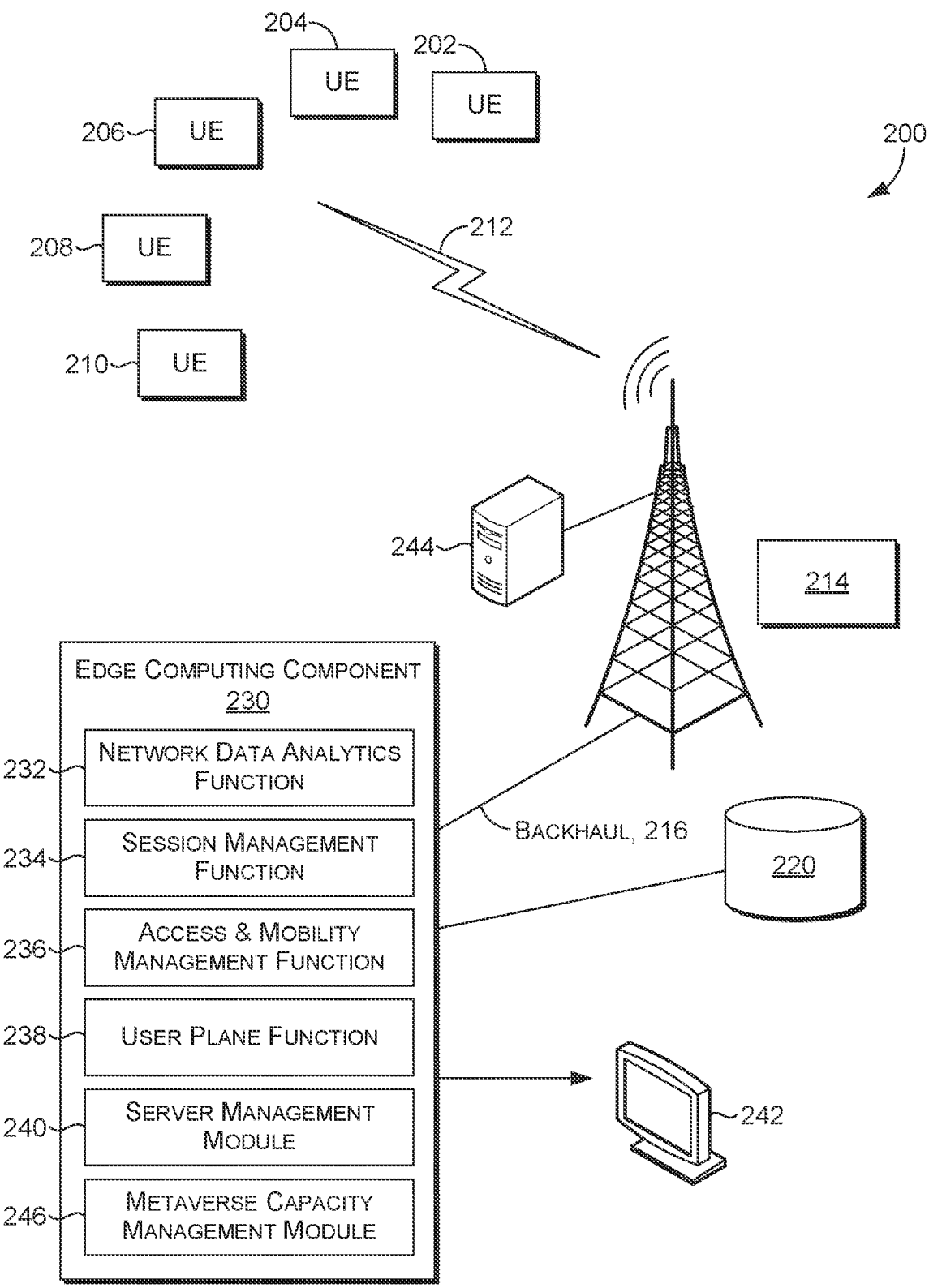
FIG. 2 depicts a diagram of an exemplary network environment in which implementations of the present disclosure may be employed, in accordance with aspects herein.

FIG. 2 depicts a diagram of an exemplary network environment in which implementations of the present disclosure may be employed. Such a network environment is illustrated and designated generally as network environment 200. Network environment 200 is not to be interpreted as having any dependency or requirement relating to any one or combination of components illustrated.

Network environment 200 includes user devices (UE) 202, 204, 206, 208, and 210, access point 214 (which may be a cell site, base station, or the like), and one or more communication channels 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, each of the UEs 202, 204, 206, 208, and 210 may correspond to computing device 100 in FIG. 1. Thus, a UE can include, for example, a display(s), a power source(s) (e.g., a battery), a data store(s), a speaker(s), memory, a buffer(s), a radio(s) and the like. In some implementations, for example, a UEs 202, 204, 206, 208, and 210 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 202, 204, 206, 208, and 210 in network environment 200 can optionally utilize one or more communication channels 212 to communicate with other computing devices (e.g., a mobile device(s), a server(s), a personal computer(s), etc.) through access point 214. The network environment 200 may be comprised of a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network environment 200 can include multiple networks, as well as being a network of networks, but is shown in more simple form so as to not obscure other aspects of the present disclosure.

The one or more communication channels 212 can be part of a telecommunication network that connects subscribers to their immediate telecommunications service provider (i.e., home network carrier). In some instances, the one or more communication channels 212 can be associated with a telecommunications provider that provides services (e.g., 3G network, 4G network, LTE network, 5G network, and the like) to user devices, such as UEs 202, 204, 206, 208, and 210. For example, the one or more communication channels may provide voice, SMS, and/or data services to UEs 202, 204, 206, 208, and 210, or corresponding users that are registered or subscribed to utilize the services provided by the telecommunications service provider. The one or more communication channels 212 can comprise, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a UE, such as UEs 202, 204, 206, 208, and 210, that are located within the geographic area, or cell, covered by radio antennas of access point 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with an edge computing component 230 and at least a network database 220 via a backhaul channel 216. The access point may also host an EDGE server 244 that stores applications and metaverse content that are frequently requested by users in the vicinity of access point 214. As the UEs 202, 204, 206, 208, and 210 collect individual status data, the status data can be automatically communicated by each of the UEs 202, 204, 206, 208, and 210 to the access point 214. Access point 214 may store the data communicated by the UEs 202, 204, 206, 208, and 210 at a network database 220. Alternatively, the access point 214 may automatically retrieve the status data from the UEs 202, 204, 206, 208, and 210, and similarly store the data in the network database 220. The data may be communicated or retrieved and stored periodically within a predetermined time interval which may be in seconds, minutes, hours, days, months, years, and the like. With the incoming of new data, the network database 220 may be refreshed with the new data every time, or within a predetermined time threshold so as to keep the status data stored in the network database 220 current. For example, the data may be received at or retrieved by the access point 214 every 10 minutes and the data stored at the network database 220 may be kept current for 30 days, which means that status data that is older than 30 days would be replaced by newer status data at 10 minute intervals. As described above, the status data collected by the UEs 202, 204, 206, 208, and 210 can include, for example, service state status, the respective UE's current geographic location, a current time, a strength of the wireless signal, available networks, and the like.

The edge computing component 230 comprises various engines including a network data analytics function (NWDAF) 232, a session management function (SMF) 234, an access and mobility management function (AMF) 236, a user plane function (UPF), a server management module 240, and a metaverse capacity management module 246. All determinations, calculations, data, and analytical results produced by the NWDAF 232, SMF 234, AMF 236, UPF 238, server management module 240, and metaverse capacity management module 246 may be stored at the network database 220. Although the edge computing component 230 is shown as a single component comprising the NWDAF 232, the SMF 234, the AMF 236, the UPF 238, the server management module 240, and metaverse capacity management module 246 it is also contemplated that each of the NWDAF 232, the SMF 234, the AMF 236, the UPF 238, the server management module 240, and metaverse capacity module may reside at different locations, be its own separate entity, and the like, within the home network carrier system.

The edge computing component 230 allows a mobile network operator to host an application server, such as EDGE server 244 in the mobile operator's location. This brings the EDGE server 244 closer to the UEs, such as UEs 202, 204, 206, 208, and 210, reducing latency for the UEs. The EDGE server 244 may dynamically select, download, and store heavily used applications and associated webpage objects. The associated webpage objects may include: GIF, JPEG, video, and CSS, to name a few. To achieve this, the mobile network operator uses network intelligence gain from the various nodes, such as NWDAF 232, SMF 234, AMF 236, and UPF 238. Each of these nodes provides important information on which contents are highly requested and should be deployed at a server, such as EDGE server 244, for edge computing.

The NWDAF 232 is a 3GPP standard method that is used to collect data from UEs, network functions, and network operations. In addition, the NWDAF 232 also collects data on network administration, maintenance systems and may collect this information from 5G core, cloud, and edge networks. The collected analytical data may be used as part of the determination of which applications to deploy in EDGE server 244. The NWDAF 232 provides analytical information as part of the edge computing component, but may be located apart from other functional blocks of the edge computing component 230.

In operation, the NWDAF 232 provides a load balancing function and in the context of this disclosure may refine, based on user subscriptions, the applications and webpage content that is stored in the EDGE server 244. The NWDAF 232 provides the analysis of what content is highly requested in the area served by access point 214.

The SMF 234 is primarily responsible for interacting with the decoupled data plane. In addition, the SMF 234 also creates, updates, and removes protocol data unit (PDU) sessions and manages context with the UPF 238. The SMF 234 may also be located separately from other functional blocks of the edge computing component 230.

The AMF 236 receives all connection and session related information from the UE, but is responsible only for handling connection and mobility management tasks. Messages relating to session management are forwarded over a reference interface to the SMF 234. The AMF 236 performs the role of access point to the 5G core, and as such terminates the radio access network (RAN) control plane and UE traffic that originates on reference interfaces. In addition, the AMF 236 implements ciphering and integrity protection algorithms, which are involved in the UE authorization process. The AMF 236 may also be located separately from other functional blocks of the edge computing component 230.

The UPF 238 allows packet gate control and user plane functions, enabling the data forwarding component to be decentralized. This allows packet processing and traffic aggregation to be performed closer to the network edge. In aspects disclosed herein, the UPF 238 assists in providing frequently requested applications and webpages in conjunction with the edge computing component 230. The UPF 238 provides the interconnect between the mobile infrastructure and the data network, including encapsulation and decapsulation of tunneling protocols, such as the General Packet Radio Service (GPRS) tunneling protocol. In operation, the UPF 238 may create a tunnel with application servers, such as EDGE server 244. The UPF 238 may also be located separately from other functional blocks of the edge computing component 230.

The server management module 240 manages the applications and webpage content that may be stored locally, such as at EDGE server 244, located at access point 214. The access point 214 may be in communication with other access points, which may also have servers located at or near the access point. In operation, the server management module 240 manages the dynamic caching servers, which may be located at access points. The highly requested content may change over time, causing some applications and webpages to consume storage space at EDGE server 244 that may no longer be highly requested. To overcome this issue, the server management module 240 periodically flushed the EDGE server 244 of stale content, making way for new application storage. The retention threshold may be configured based on network intelligence data on which applications and webpages are highly requested in the area served by an access point 214. The retention threshold may also be based on a date, time, number of requests falling before a predetermined threshold, or a more recent identification of highly requested content. Before storing content on the EDGE server 244 a security check may be performed, to ensure that permissions are in place before edge computing operations occur.

The metaverse capacity management module 246 monitors a number of visitors or shoppers visiting a virtual store. The shoppers can see each other, so shoppers can see if a store is crowded with other virtual shoppers, or is empty. The metaverse capacity management module 246 may be set with a predetermined fill threshold and when that predetermined fill threshold is met, a duplicate copy of the virtual store is opened in real time. Shoppers would be unaware of being assigned to the original store or one of multiple duplicate copies or slices. The metaverse capacity management module 246 operates in conjunction with a local metaverse server, which may be similar to EDGE server 244. This places metaverse content near local users. Metaverse capacity management module 246 may enable multiple copies of duplicated virtual spaces with a real-time allocation mechanism to assign new shoppers or visitors to different duplicates or slices.

Figure 3:
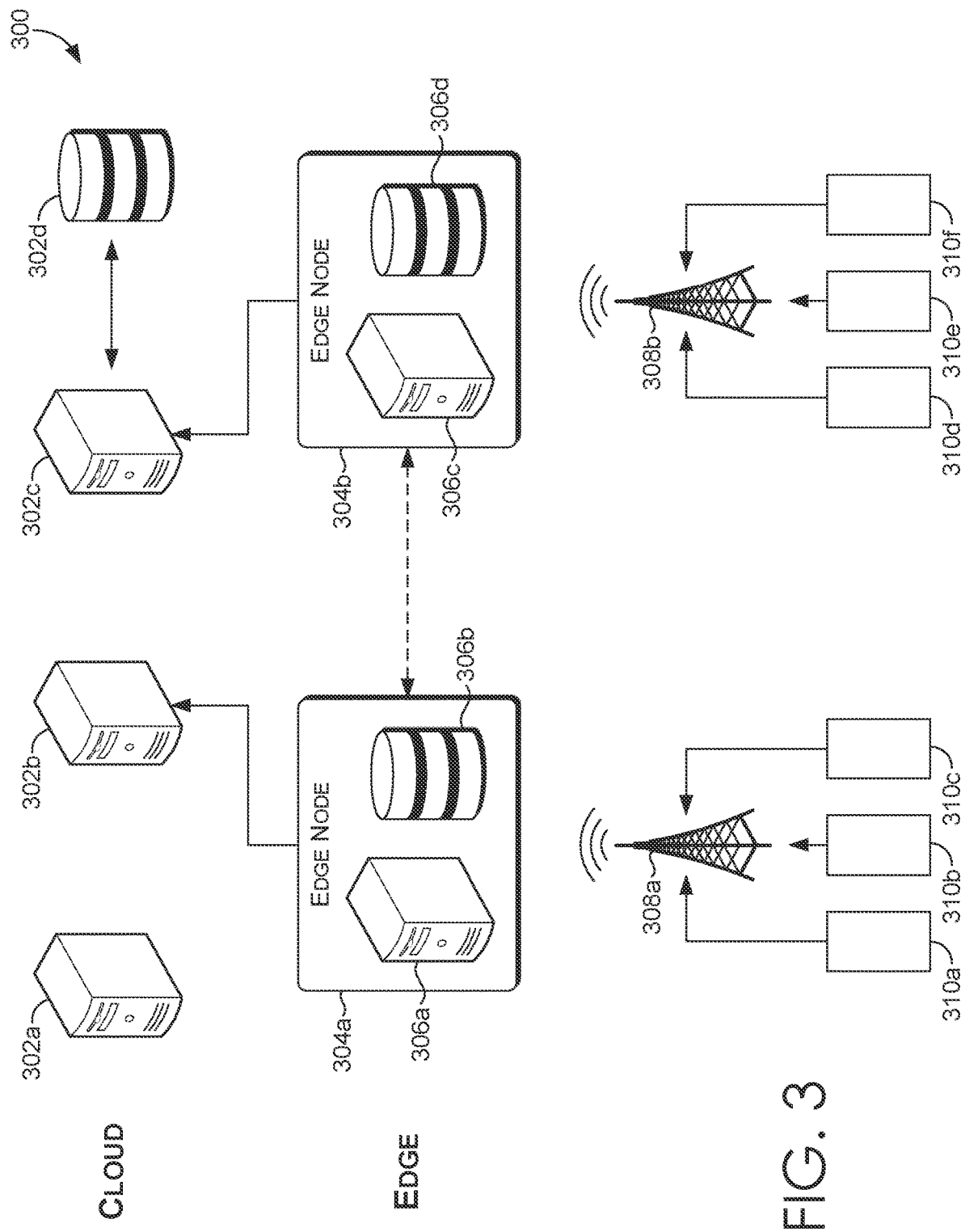
FIG. 3 depicts an edge computing infrastructure in which implementations of the present disclosure may be employed, in accordance with aspects herein.

FIG. 3 depicts an edge computing infrastructure in which implementations of the present disclosure may be employed. Edge computing is a distributed computing paradigm that brings computation, and here, delivery of content, closer to the users of data and content. In an edge computing system 300 there are cloud servers 302a-302c, which may host a variety of application programs and webpage content. The content may be hosted at an edge node 304a or 304b. The edge nodes 304a and 304b may be in communication with servers, as shown by edge node 304a in communication with server 302b and edge node 304b in communication with 302c. The cloud servers 302a-302c may also communicate with a host 302d. Host 302d is depicted as communicating with server 302c.

The edge nodes 304a and 304b may contain edge node servers 306a and host 306b, for edge node 304a with server 306c and host 306d for edge node 304b. The hosts 306b and edge node host 306d may remotely host applications and webpages. Edge nodes 304a and 304b may also share content. The distributed nature of edge computing causes data to travel between different distributed nodes connected through the internet and this requires special encryption and security mechanisms that are independent of the cloud.

Access points 308a and 308b may also communicate wirelessly with edge nodes 304a and 304b. Users 310a-310f may request specific content from the edge node servers 306a and edge node host 306b, depending on which access point 308a or 308b is serving at the time the request is made.

The metaverse provides a simulation of a virtual-world space with multiple users, which may be shopper avatars, salesperson avatars, or customer avatars. Salesperson avatars may be managed by a core network and a pool system, while shopper avatars may be managed by the EDGE server. Salesperson avatars may be managed and assigned on an as-needed basis. Local servers in the EDGE network communicate with the core network to request salesperson avatars.

As more shoppers visit the metaverse store multiple copies of the metaverse store may be enabled using a real-time allocation mechanism to assign newcomers to different duplicate metaverse store copies. The duplicate metaverse store copies may be different sizes, with some stores having the capacity for only ten customers, while other stores may handle 100 or more customers. Customers may be grouped by group size and may also book private virtual spaces.

To implement a metaverse capacity management system an operator first estimates the size of the virtual space needed for the operation. As one example, the virtual space may mimic an actual store, park, arcade, theater, or other space. As virtual space is less expensive than real space an operator may elect a larger space than used in the real world. One example of a virtual space could be a virtual retail phone store. The virtual retail phone store may provide space to show all phones grouped by makers and types, such as smart phones, tablets, portable hot spots, etc. The virtual retail phone store may also have a separate space for phone accessories such as chargers, phone covers, screen protectors, speakers, earbuds, and other accessories. In addition, the virtual retail phone store may be more visually appealing when customer avatars can freely move around, much as in a physical store. The salesperson avatars would also be free to move around to interact with customer avatars.

Once the virtual store is designed, the store operator may set a predetermined space capacity and may also set a policy for controlling the fill rate of the space. An operator may set a predetermined fill threshold, such as 60%, of the design capacity and once the predetermined fill threshold is met, the system automatically triggers a duplicate copy of the store. Newcomers may appear in the duplicate copy of the store. Different types of metaverse spaces have different needs, gaming, for example, has high latency requirements and bandwidth needs that may limit a number of users in a metaverse gaming space.

Each newly opened duplicate copy of the metaverse store may be assigned a sequential identifier. Every time a new customer arrives, the system checks the existing metaverse store and duplicates to determine where the new customer may be added. The duplicates may be managed to avoid needlessly creating duplicate metaverse stores and slices. When a duplicate store or slice is found, newly arriving customers may be assigned to the busiest duplicate metaverse store that has capacity, that is, is under the predetermined fill threshold for that duplicate metaverse store. Empty duplicate metaverse stores may be closed after serving the last customer. If all of the existing duplicate metaverse stores are at or above their predetermined fill thresholds, then a new duplicate metaverse store may be created.

Users may locate friends and family in the metaverse stores and may join them, if allocated to different duplicate metaverse stores. Customers may communicate with the capacity management system to find their friends by name or user identifier and may then join them if the friends are allocated to different duplicate metaverse stores. Operators may improve the appearance of their metaverse stores by adding faked or hypothetical other customers and salespersons to the store. Customers may wonder if a store does not have good products or the service is poor if the store is empty. When additional customers arrive, the hypothetical customers and hypothetical salespeople may leave the store. The departure of the hypothetical avatars may be based on a predetermined customer threshold for hypothetical avatars. Salesperson avatars may be adjusted as needed based on predetermined thresholds. The business may determine the best ratio of salespersons, which may be based on staffing levels in physical stores or prior metaverse store metrics. The balancing and allocation of salesperson avatars occurs in the background and customers are not aware of anything other than normal movement of salespersons through the metaverse store.

As demand increases more duplicate metaverse stores are opened. This opening of additional duplicate metaverse stores may be limited by hardware, such as when a CPU or GPU, or memory reaches a limit. When this occurs, arriving customers may be informed that the metaverse store is full and ask if the customer would like to return at a later time. This may operate like a reservation.

The management methods discussed herein operate within a single sales channel or uniform resource locator (URL). Additional metaverse space may be provided adding duplicates on an as-needed basis, and adding only as many duplicate metaverse spaces as needed. Operators may need to manage a cluster of virtual machines that collaborate in the background to support potentially needed capacity.

Figure 4:
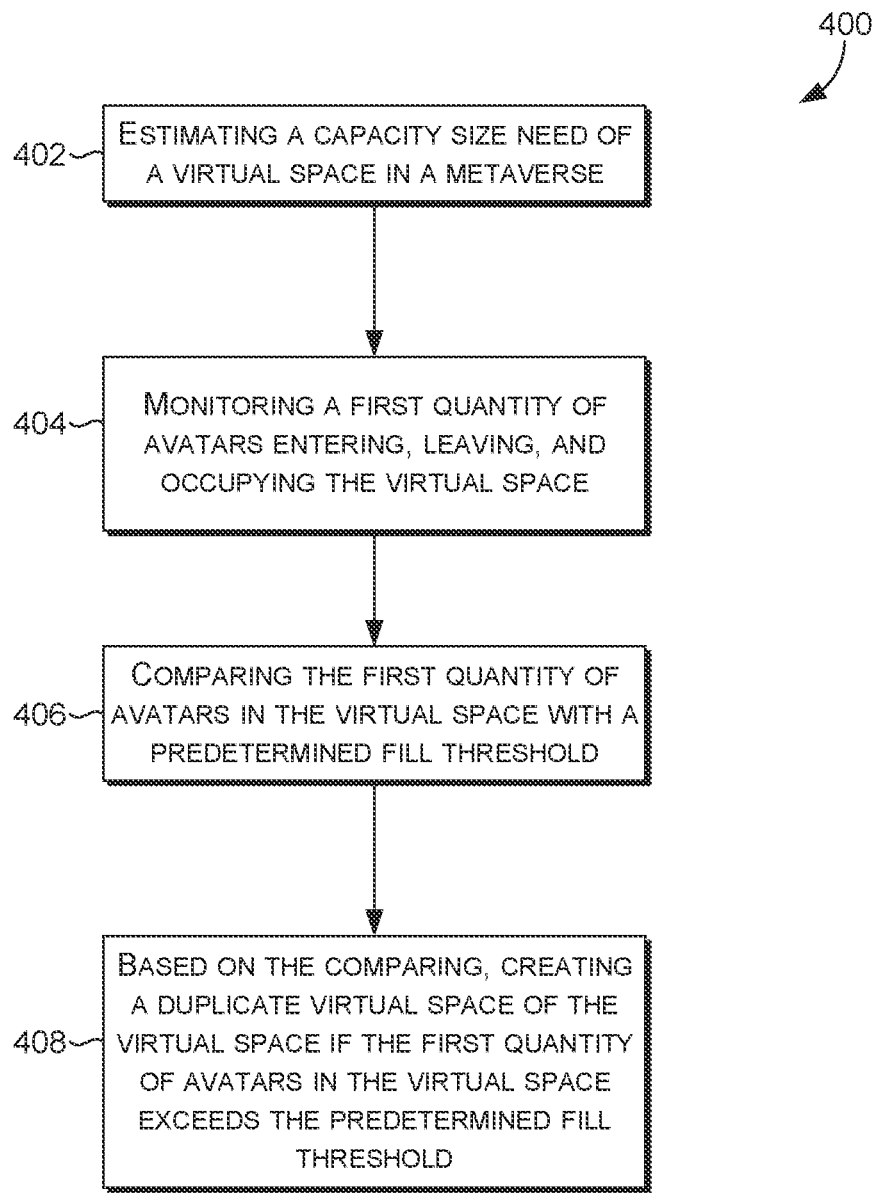
FIG. 4 is a flowchart of a method of capacity management of virtual space in the metaverse, in accordance with aspects herein.

FIG. 4 is a flowchart of a method for capacity management of virtual space in a network. The method 400 begins in step 402 with estimating a capacity size need of a virtual space in a metaverse. The owner of the virtual space may select a capacity based on a physical location or may opt to provide a larger space as virtual space is more economical. The method continues in step 404 with monitoring a first quantity of avatars entering, leaving, and occupying the virtual space. Next, in step 406, the method continues with comparing the first quantity of avatars in the virtual space with a predetermined fill threshold. The predetermined fill threshold may be chosen by the owner of the virtual space and may be based on prior data for the virtual space, data from traffic pattern analysis of a physical location, or other considerations, such as need to interact in the space. Then, in step 408, based on the comparing, create a duplicate virtual space of the virtual space if the first quantity of avatars in the virtual space exceeds the predetermined fill threshold.

Duplicate virtual spaces may be assigned a sequential identifier which allows for tracking the creation of the duplicate virtual spaces and time needed to reach the predetermined fill threshold. Each duplicate virtual space is also monitored for a respective quantity of avatars. The duplicate virtual space may use the same predetermined fill threshold as the initial virtual space, or a different predetermined fill threshold may be used for the sequential duplicate spaces. When a duplicate virtual space may be needed, the network may check for EDGE site capacity on sites near the virtual space. New users may be allocated to the duplicate virtual space at a nearby EDGE server if that EDGE server has capacity. If the local capacity is full and there is no capacity at a nearby EDGE server the customer may be turned down.

The avatars in the duplicate virtual spaces may also include hypothetical avatars such as hypothetical salespersons and hypothetical customers to increase the appeal of the virtual space. Users will not know if they are visiting the original virtual space or a duplicate virtual space. The hypothetical avatars are not counted in determining if the predetermined fill rate for the original virtual space or a duplicate virtual space have been exceeded. Groups may be formed by customers or users who wish to visit the virtual space together. Customers may request to form a group and the group will be kept together when reassignment to different virtual spaces occurs as the predetermined fill threshold is exceeded or the predetermined minimum number of avatars is not met. When the predetermined number of avatars in a virtual space is not met, any duplicate virtual spaces may be closed and the avatars reassigned to an original or duplicate virtual space with a lower sequential identifier.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for capacity management of virtual space in a network, the method comprising:
by a metaverse capacity management module:
receiving an input of a capacity size need of a virtual space in a metaverse;
monitoring a first quantity of avatars entering, leaving, and occupying the virtual space;
comparing the first quantity of avatars in the virtual space with a predetermined fill threshold;
determining that the first quantity of avatars in the virtual space exceeds the predetermined fill threshold; and
based on the determining that the first quantity of avatars in the virtual space exceeds the predetermined fill threshold, creating a duplicate virtual space of the virtual space when the first quantity of avatars in the virtual space exceeds the predetermined fill threshold.

2. The method of claim 1, further comprising assigning a sequential identifier to the duplicate virtual space.

3. The method of claim 2, further comprising monitoring the duplicate virtual space for a second quantity of avatars.

4. The method of claim 3, further comprising comparing the second quantity of avatars in the duplicate virtual space with the predetermined fill threshold.

5. The method of claim 4, further comprising creating at least one additional duplicate virtual space based on the second quantity of avatars exceeding the predetermined fill threshold.

6. The method of claim 4, further comprising reassigning one or more avatars in the second quantity of avatars in the duplicate virtual space to the virtual space and closing the duplicate virtual space when the duplicate virtual space is occupied by less than a predetermined minimum quantity of avatars.

7. The method of claim 1, wherein hypothetical avatars in the virtual space are not included in the first quantity of avatars in the virtual space.

8. The method of claim 7, wherein the hypothetical avatars comprise hypothetical customers and salesperson avatars.

9. The method of claim 1, further comprising receiving a request from a customer to form a group with at least one other customer avatar.

10. The method of claim 9, wherein the group is assigned to the virtual space and kept together as duplicate virtual spaces are closed or opened.

11. A system for capacity management of virtual space in a network, the system comprising:
one or more processors; and
one or more computer-readable media storing computer-usable instructions that, when executed by the one or more processors, cause the processors to:
receive an input of a capacity size need of a virtual space in a metaverse;
monitor a first quantity of avatars entering, leaving, and occupying the virtual space;
compare the first quantity of avatars in the virtual space with a predetermined fill threshold;
determine that the first quantity of avatars in the virtual space exceeds the predetermined fill threshold; and
based on determining that the first quantity of avatars in the virtual space exceeds the predetermined fill threshold, automatically create a duplicate virtual space of the virtual space when the first quantity of avatars in the virtual space exceeds the predetermined fill threshold.

12. The system of claim 11, further comprising assign a sequential identifier to the duplicate virtual space.

13. The system of claim 11, further comprising monitor the duplicate virtual space for a second quantity of avatars.

14. The system of claim 13, further comprising compare the second quantity of avatars in the duplicate virtual space with the predetermined fill threshold.

* * * * *